United States Patent
Wrobel et al.

(10) Patent No.: US 12,469,622 B2
(45) Date of Patent: Nov. 11, 2025

(54) INSULATING HOLDER FOR MULTI-PHASE BUS BAR

(71) Applicant: Rockwell Automation Technologies, Inc., Mayfield Heights, OH (US)

(72) Inventors: Szymon Wrobel, Katowice (PL); Jacek Kijanko, Tychy (PL); Saleh Khosravi, Bad Säckingen (DE); Marcin Matuszek, Katowice (PL); Alonso Vega, Barcelona (ES); Olga Abizanda, Barcelona (ES)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 569 days.

(21) Appl. No.: 17/955,084

(22) Filed: Sep. 28, 2022

(65) Prior Publication Data

US 2024/0105363 A1    Mar. 28, 2024

(51) Int. Cl.
*H01B 17/18*    (2006.01)
*H02G 5/02*    (2006.01)

(52) U.S. Cl.
CPC ............. *H01B 17/18* (2013.01); *H02G 5/025* (2013.01)

(58) Field of Classification Search
None
See application file for complete search history.

(56) References Cited

U.S. PATENT DOCUMENTS

| | | | | |
|---|---|---|---|---|
| 3,930,706 A | * | 1/1976 | Obuch ................. | H01R 13/112 439/660 |
| 4,004,845 A | * | 1/1977 | Sochor ................. | H01R 12/00 439/682 |
| 4,022,967 A | * | 5/1977 | Bulanchuk ............. | H02G 5/025 191/40 |
| 4,127,312 A | * | 11/1978 | Fleischhacker ...... | H01R 13/112 439/403 |
| 4,174,877 A | * | 11/1979 | Foederer ............... | H01R 4/245 439/425 |
| 4,205,198 A | * | 5/1980 | Boyle .................... | H01B 17/18 174/171 |

(Continued)

FOREIGN PATENT DOCUMENTS

| CA | 3064104 A1 | 6/2020 |
|---|---|---|
| DE | 102010007250 B4 | 3/2012 |

(Continued)

OTHER PUBLICATIONS

Translation of EP1137035 (Year: 2001).*
Extended European Search Report for Application No. 23198266.1 dated Feb. 26, 2024 (15 pages).

*Primary Examiner* — Timothy J. Dole
*Assistant Examiner* — Muhammed Azam
(74) *Attorney, Agent, or Firm* — Boyle Fredrickson, S.C.

(57) ABSTRACT

A bus bar assembly includes multiple bus bars, multiple insulating holders, and a housing. Each of the insulating holders is configured to be mounted to one of the bus bars. Each of the insulating holders includes multiple ribs positioned within an interior cavity of the corresponding insulating holder, and the ribs maintain a desired air gap between each insulating holder and the corresponding bus bar mounted in the insulating holder. The housing is configured to receive each of the bus bars and the corresponding insulating holder.

18 Claims, 11 Drawing Sheets

(56) References Cited

U.S. PATENT DOCUMENTS

| | | | | |
|---|---|---|---|---|
| 4,227,763 | A * | 10/1980 | Marks | H01R 4/2462 439/392 |
| 4,401,843 | A * | 8/1983 | Harper | H02G 5/005 174/72 B |
| 4,546,542 | A * | 10/1985 | Proud | H01R 43/16 29/874 |
| 4,583,813 | A * | 4/1986 | Yamada | H01R 13/112 439/348 |
| 4,720,272 | A * | 1/1988 | Durand | H01R 33/09 439/375 |
| 4,954,090 | A * | 9/1990 | Shimochi | H01R 9/2458 439/721 |
| 5,008,493 | A * | 4/1991 | Wagener | H02G 5/04 174/68.2 |
| 5,011,417 | A * | 4/1991 | Matsumoto | H05K 7/026 439/76.2 |
| 5,024,627 | A * | 6/1991 | Bennett | H01R 12/721 439/631 |
| 5,160,274 | A * | 11/1992 | Ozaki | H01R 9/2458 439/724 |
| 5,189,596 | A * | 2/1993 | Runge | H02B 1/20 174/68.2 |
| 5,207,591 | A * | 5/1993 | Ozaki | H01R 9/2458 439/724 |
| 5,295,847 | A * | 3/1994 | Ozaki | H01R 9/2458 439/724 |
| 5,329,424 | A * | 7/1994 | Patel | H05K 3/301 361/748 |
| 5,422,440 | A * | 6/1995 | Palma | H05K 7/14329 174/70 B |
| 5,490,794 | A * | 2/1996 | Kobayashi | H01R 9/226 439/212 |
| 5,605,465 | A * | 2/1997 | Kobayashi | H01R 43/16 439/724 |
| 5,908,322 | A * | 6/1999 | Seki | H01R 9/2458 439/949 |
| 6,320,130 | B1 * | 11/2001 | Takahashi | H02G 5/005 174/68.2 |
| 6,325,640 | B1 * | 12/2001 | Kasai | H01R 25/168 439/949 |
| 6,354,846 | B1 * | 3/2002 | Murakami | H05K 3/301 439/148 |
| 6,494,723 | B2 * | 12/2002 | Yamane | H05K 7/026 439/907 |
| 6,558,198 | B2 * | 5/2003 | Kobayashi | H01H 85/0417 439/830 |
| 6,875,923 | B2 * | 4/2005 | Egawa | H01R 9/226 174/68.2 |
| 6,905,346 | B2 * | 6/2005 | Momota | H01R 9/226 361/833 |
| 8,659,715 | B2 * | 2/2014 | Lee | H01R 33/02 349/58 |
| 8,794,982 | B2 * | 8/2014 | Yamamoto | B60R 16/0238 439/949 |
| 8,808,031 | B2 * | 8/2014 | Zhao | H01M 10/425 439/620.33 |
| 9,019,716 | B2 * | 4/2015 | Sakai | H01R 13/055 174/72 B |
| 9,118,129 | B2 * | 8/2015 | Onoda | H01R 43/24 |
| 9,269,474 | B2 * | 2/2016 | Craig | H02G 5/00 |
| 10,192,652 | B2 * | 1/2019 | Fujiwara | H02K 3/12 |
| 10,686,273 | B2 * | 6/2020 | Ogura | H01R 13/502 |
| 10,834,834 | B2 * | 11/2020 | Mitsui | H01R 33/88 |
| 10,855,006 | B2 * | 12/2020 | Ogasawara | H01M 10/482 |
| 11,211,673 | B2 * | 12/2021 | Shimizu | H01G 2/10 |
| 11,374,288 | B2 * | 6/2022 | Omura | H01M 50/507 |
| 11,735,891 | B2 * | 8/2023 | Rai | B60R 16/0238 174/15.1 |
| 11,764,494 | B2 * | 9/2023 | Stolze | H01R 4/4821 439/441 |
| 11,811,095 | B2 * | 11/2023 | Kwon | H01M 50/503 |
| 12,080,963 | B1 * | 9/2024 | Chen | H01R 11/01 |
| 2003/0049971 | A1 | 3/2003 | Mercader et al. | |
| 2003/0090358 | A1* | 5/2003 | Morimoto | H01L 25/072 257/E25.031 |
| 2004/0185722 | A1* | 9/2004 | Conrad | H01R 13/112 439/857 |
| 2014/0354094 | A1* | 12/2014 | Yazaki | H02K 3/28 310/71 |
| 2023/0223712 | A1* | 7/2023 | Schaper | H01H 1/5844 439/716 |
| 2024/0088578 | A1* | 3/2024 | Meyer | H01R 11/09 |
| 2025/0113437 | A1* | 4/2025 | Matsumura | H02B 1/20 |

FOREIGN PATENT DOCUMENTS

| | | |
|---|---|---|
| EP | 1137035 A1 | 9/2001 |
| EP | 3301695 A1 | 4/2018 |
| JP | 2016063653 A | 4/2016 |

* cited by examiner

INSULATING HOLDER FOR MULTI-PHASE BUS BAR

BACKGROUND INFORMATION

The subject matter disclosed herein relates to an insulating holder for conductive rails in a power distribution system. More specifically, insulating holders are provided which maintain an airgap between the insulating holder and bus bar to reduce electric fields present on the surface of the bus bar.

As is known to those skilled in the art, power distribution centers are typically used to facilitate distribution of utility power in an industrial environment. The power distribution center may include or is connected to switchgear which provides a primary point of establishing and/or interrupting connection to the utility grid. One or more transformers may step down the voltage received from the utility grid to a desired voltage level for use by various equipment within a facility. The output of the transformer is run via distribution busses within the power distribution center to additional circuit protection equipment, power converters, motor drives, or various other power electronic devices. The power electronic devices then provide connections to devices external from the power distribution center.

In order to facilitate assembly, many elements of the power distribution center may be constructed in a modular manner. The elements required for a specific application may be selected and inserted within the power distribution center. The bus bars making up the distribution busses may similarly be of modular construction. A single bus bar may be in predefined lengths and fit between elements. For multi-phase systems, multiple bus bars may be provided that connect between elements. A three-phase system, for example, may include a set of three bus bars to connect between terminals of elements within the power distribution system.

In order to increase space utilization, it is desirable to include a greater number of elements in a reduced space. The bus bars interconnecting the elements are similarly arranged in a compact manner. For safety, however, minimum distances must be maintained between adjacent bus bars. For a modular assembly, these minimum distances may be maintained by positioning adjacent bus bars as inserts within a mold and overmolding the bus bars with an insulative plastic. When the plastic cools, the plastic provides insulation between adjacent bus bars and holds the bus bars at the desired spacing.

However, such overmolded bus bars have not been fully met without incurring various certain disadvantages. Some air may become trapped between the bus bars and the plastic material creating narrow air gaps between the metal bus bars and insulating plastic. Further, because the air gap is unintentional, the width may vary along the length of the bar, where the width ranges from having no air gap to having a maximum width of the air gap. Within this air gap, partial discharge may occur. Partial discharge creates a region between the metal and the insulating plastic having a high electric potential. Over time, a continued presence of this high electric potential from partial discharge can cause breakdown and eventually failure of the insulation around the bus bar.

Thus, it would be desirable to provide an improved method of assembling modular bus bars to reduce partial discharge within the bus bar assembly.

BRIEF DESCRIPTION

According to one embodiment of the invention, an insulating holder for a bus bar is disclosed, where the bus bar has a first terminal, a second terminal, and a conductive strip between the first terminal and the second terminal. The insulating holder includes a first surface configured to cover a corresponding first surface of the bus bar and a second surface configured to cover a portion of a corresponding second surface of the bus bar, where the second surface is opposite the first surface. The insulating holder also includes a spanning surface extending between the first surface and the second surface, a first side surface extending orthogonally from the first surface toward the second surface, and a second side surface extending orthogonally from the first surface toward the second surface. The second side surface is opposite the first side surface, and a cavity is defined between the first surface, the second surface, the spanning surface, the first side surface, and the second side surface. The cavity is configured to receive, at least in part, the bus bar. The insulating holder also includes multiple ribs, wherein each of the ribs is positioned on either the first surface, the second surface, the spanning surface, the first side surface, or the second side surface facing toward the cavity.

According to another embodiment of the invention, a bus bar assembly includes multiple bus bars, multiple insulating holders, and a housing. Each of the insulating holders is configured to be mounted to one of the bus bars. Each of the insulating holders includes multiple ribs positioned within an interior cavity of the corresponding insulating holder. The ribs maintain a desired air gap between each insulating holder and the corresponding bus bar mounted in the insulating holder. The housing is configured to receive each of the bus bars and the corresponding insulating holder.

According to still another embodiment of the invention, an insulating holder for a bus bar includes multiple sides defining a geometric shape having an interior cavity and at least one open side surface. The at least one open side surface is configured to receive the bus bar within the interior cavity of the insulating holder. The insulating holder also includes multiple ribs, where each of the ribs is spaced apart within the interior cavity. The ribs establish a uniform air gap between a surface of the interior cavity and the bus bar.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
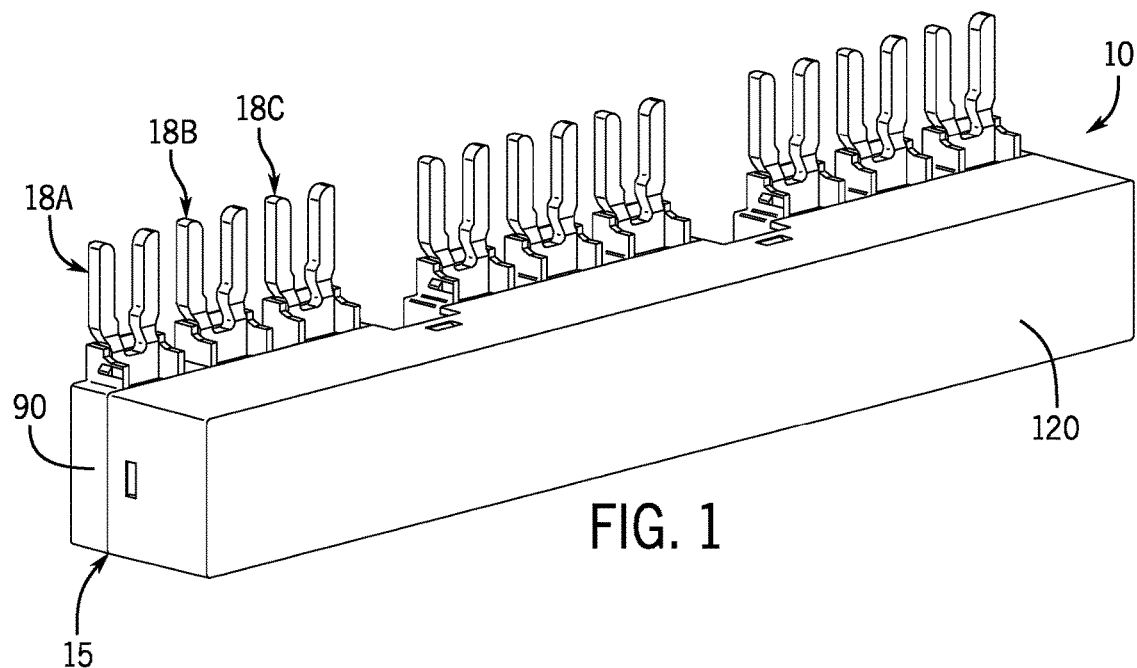
FIG. 1 is a perspective view of a bus bar assembly incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved method of assembling modular bus bars to reduce partial discharge within the bus bar assembly. A housing is provided which holds multiple bus bars, where each bus bar has at least two terminals connecting power between two points within a power distribution center. According to one embodiment, the housing holds three bus bars, and each bus bar has three terminals. An insulating holder is slid on to and provided for each bus bar. The insulating holder is made of a rigid plastic material to maintain its shape and includes ribs within the holder to engage the bus bar. The ribs maintain a desired air gap between the bus bar and the insulating holder. The air gap is selected to reduce partial discharge between the bus bar and the insulating holder. Additionally, the air gap is generally uniform such that electric potential that is present as a result of partial discharge is uniformly distributed along the length of the bus bar.

Figure 2:
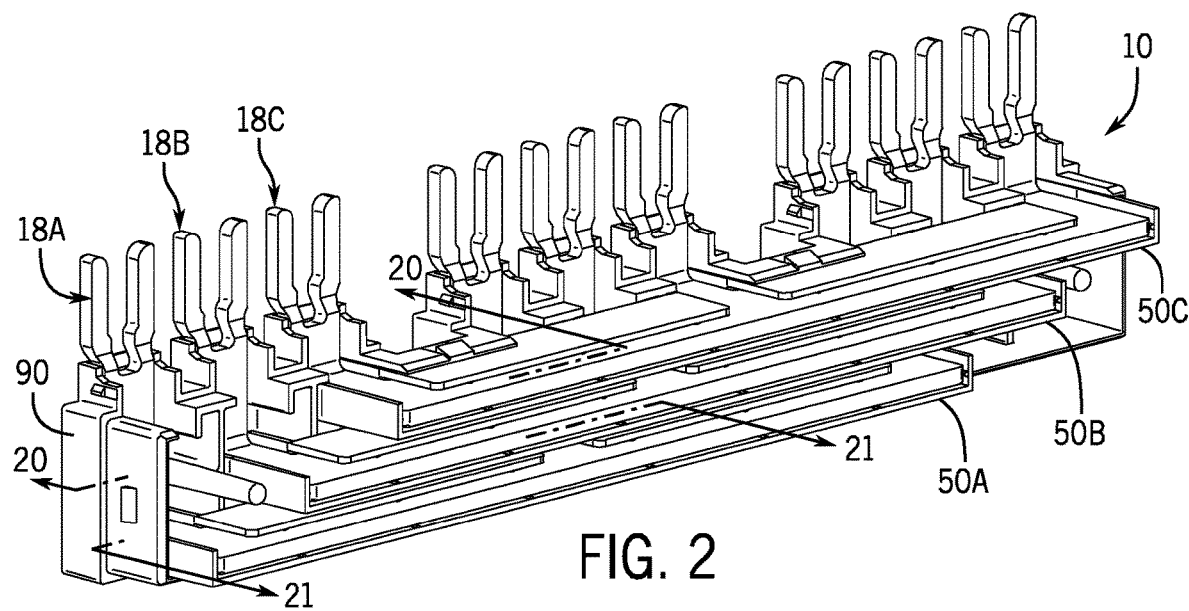
FIG. 2 is a perspective view of the bus bar assembly of FIG. 1 with a front housing removed.
Figure 3:
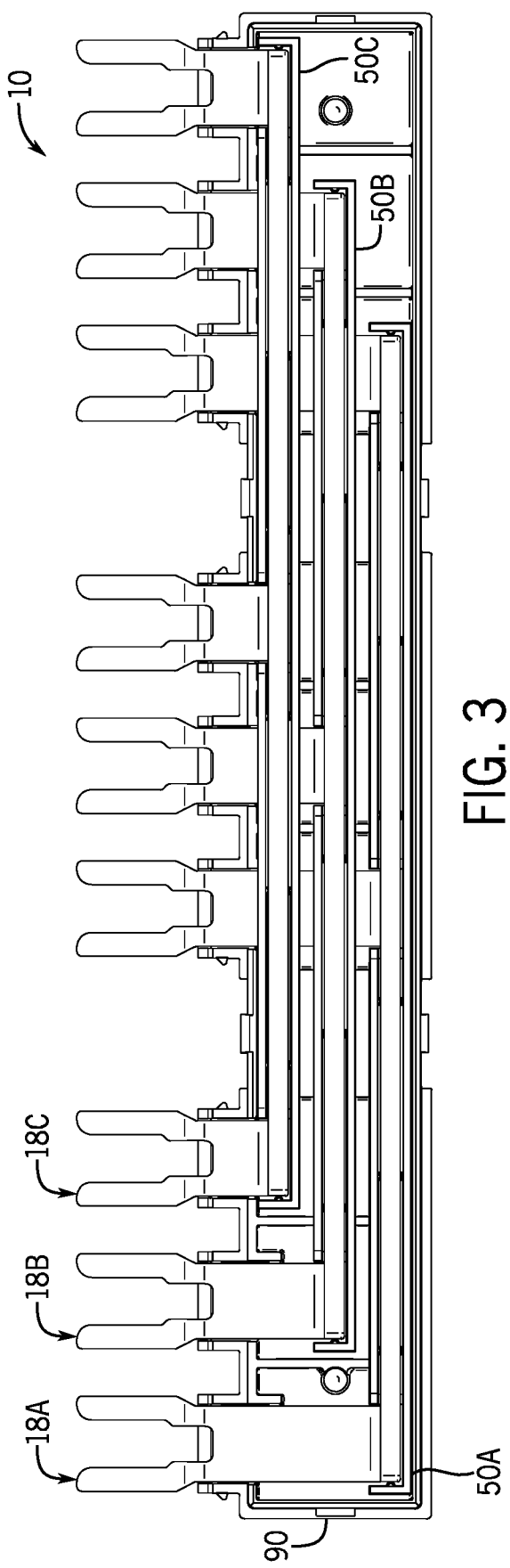
FIG. 3 is a front elevation view of the bus bar assembly of FIG. 2.
Figure 4:
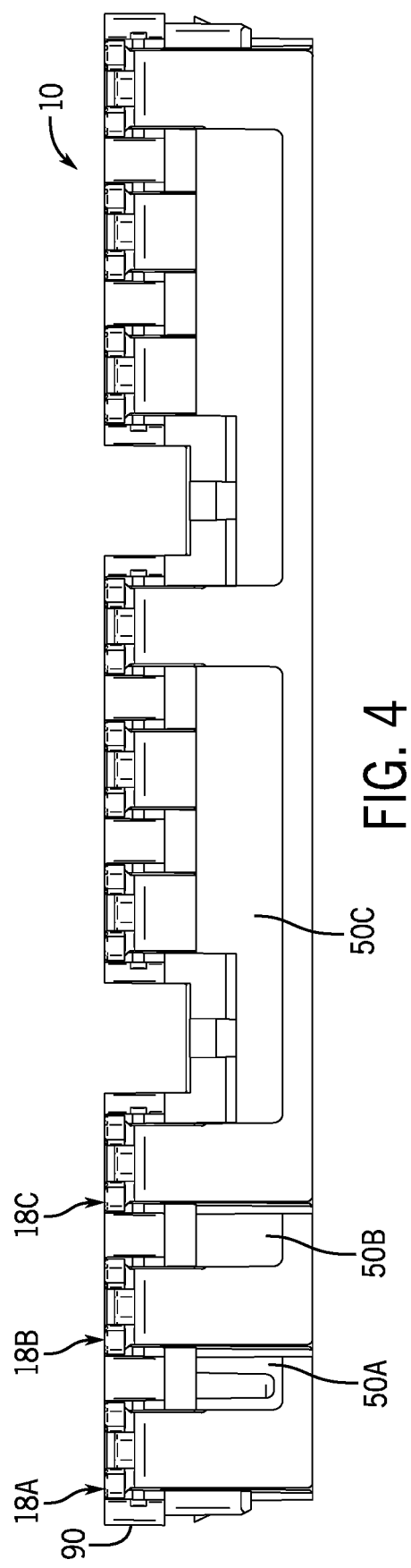
FIG. 4 is a top plan view of the bus bar assembly of FIG. 2.
Figure 5:
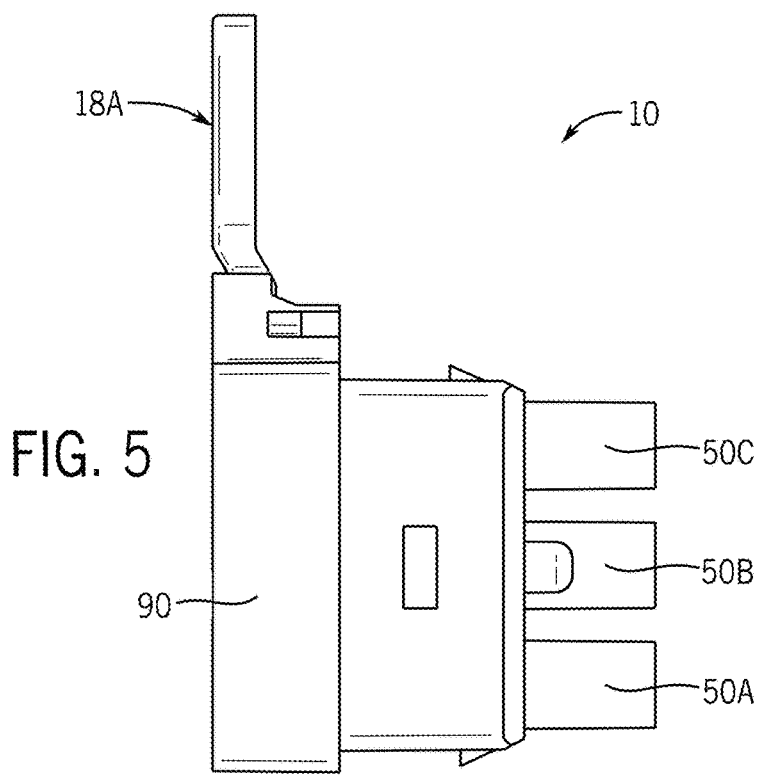
FIG. 5 is a side elevation view of the bus bar assembly of FIG. 2.

Turning initially to FIG. 1, a bus bar assembly 10 according to one embodiment of the invention is illustrated. The bus bar assembly 10 includes a housing 15 made up of two pieces removably connected to each other. A front housing 120 engages a rear housing 90, as will be discussed in more detail below, to form the housing 15. The housing 15 is configured to receive multiple bus bars 18. It is noted that the bus bars may be referred to generally herein by reference numeral 18. Alternately, specific bus bars may be identified by reference numeral 18 followed by a letter, such as 18A, 18B, and 18C as shown in FIG. 1. With reference also to FIG. 2, the bus bar assembly includes multiple insulating holders 50A, 50B, 50C. Each insulating holder 50 is configured to be mounted on a bus bar 18, and an insulating holder 50 is provided on each of the bus bars 18. The combination of each bus bar 18 and the corresponding insulating holder 50 are inserted into a slot on the housing 15. It is noted that the insulating holders may be referred to generally herein by reference numeral 50. Alternately, specific insulating holders may be identified by reference numeral 50 followed by a letter, such as 50A, 50B, and 50C as shown in FIG. 2.

Figure 6:
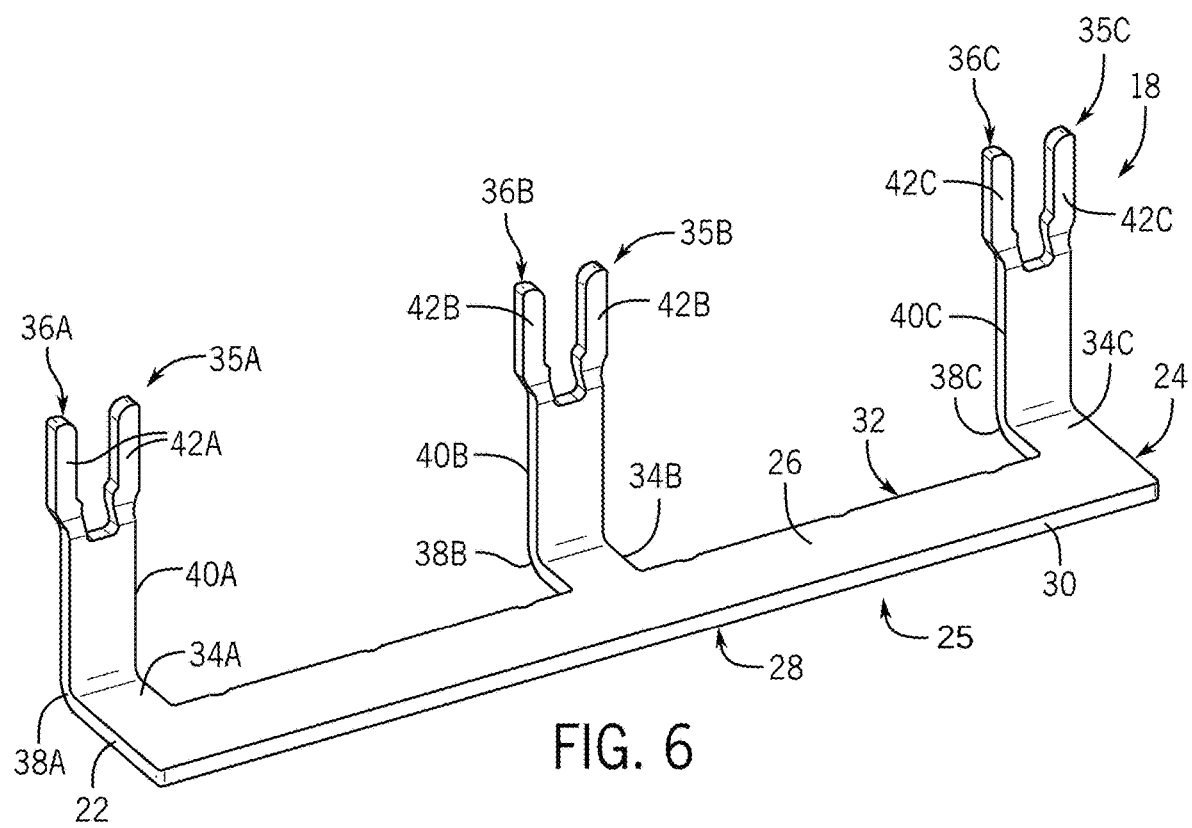
FIG. 6 is a perspective view of a bus bar from the bus bar assembly of FIG. 1.
Figure 7:
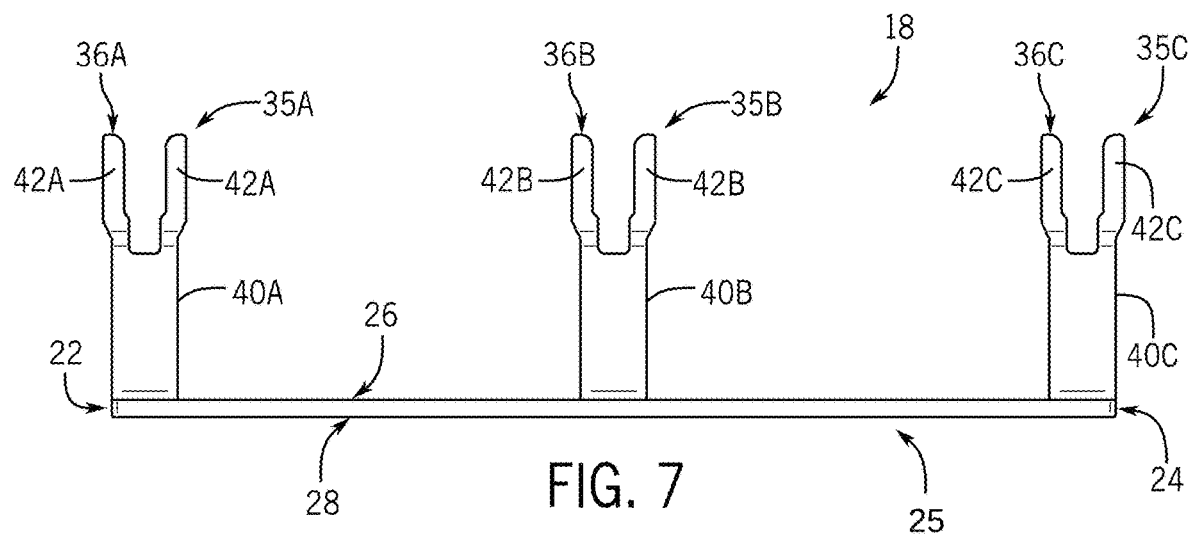
FIG. 7 is a front elevation view of the bus bar of FIG. 6.
Figure 8:
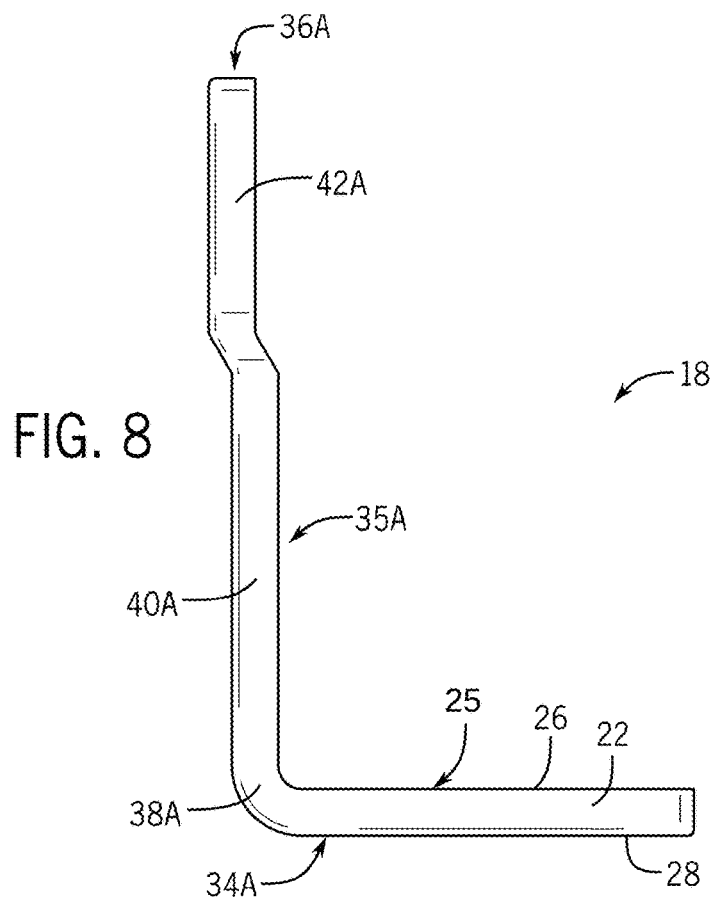
FIG. 8 is a side elevation view of the bus bar of FIG. 6.
Figure 9:
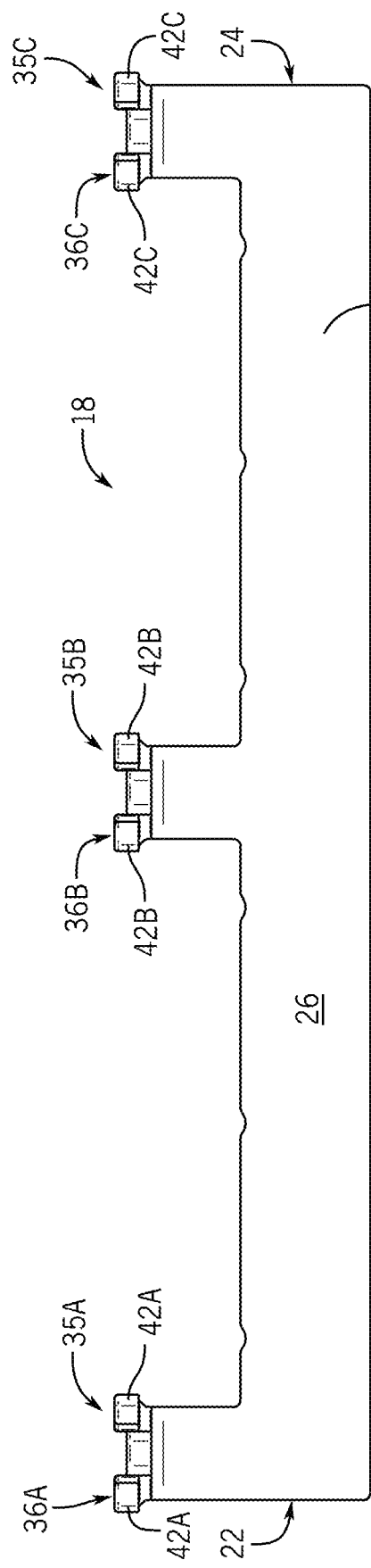
FIG. 9 is a top plan view of the bus bar of FIG. 6.
Figure 10:
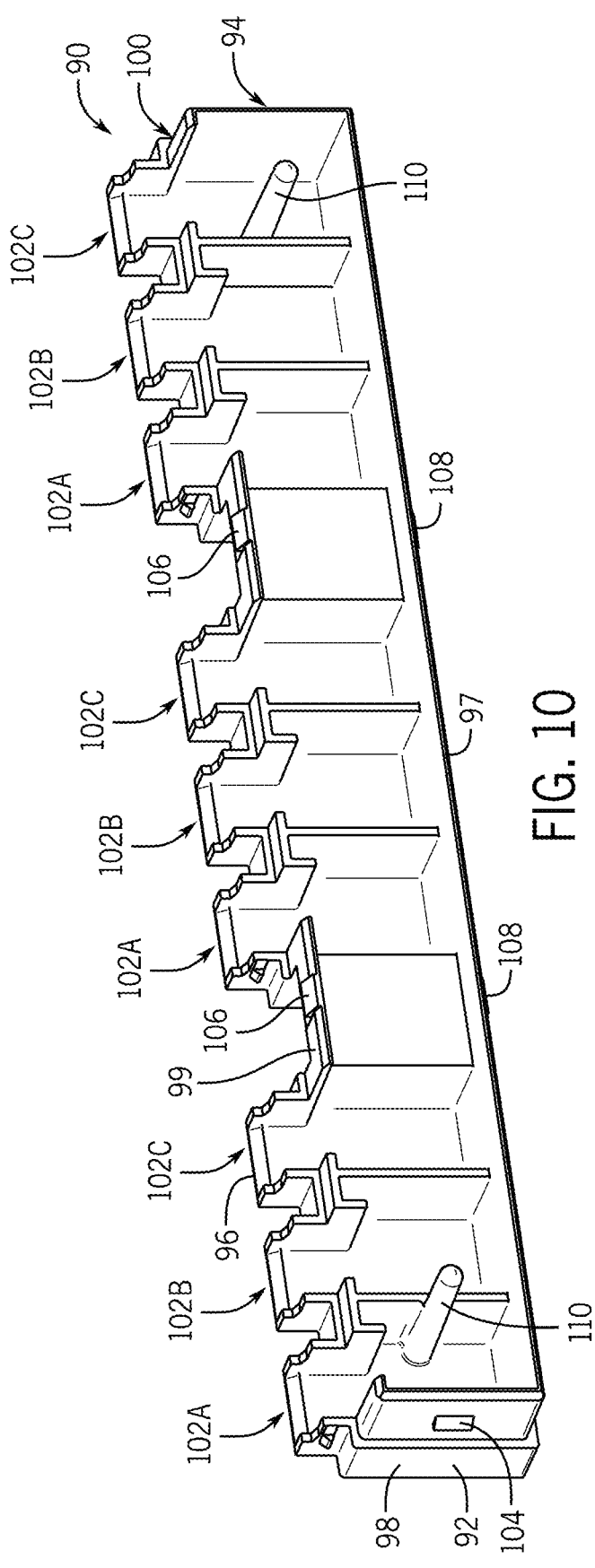
FIG. 10 is a perspective view of a rear housing from the bus bar assembly of FIG. 1.
Figure 11:
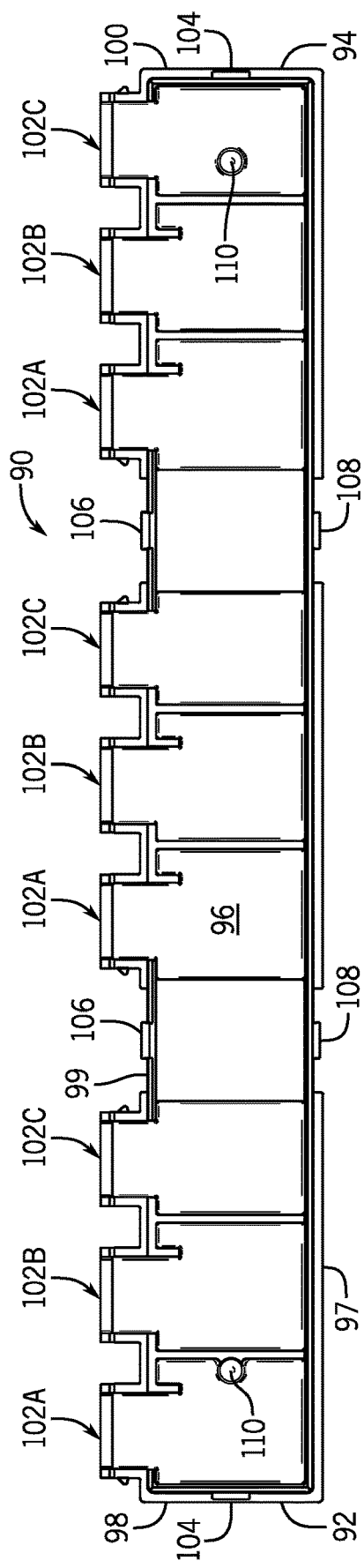
FIG. 11 is a front elevation view of the rear housing of FIG. 10.
Figure 12:
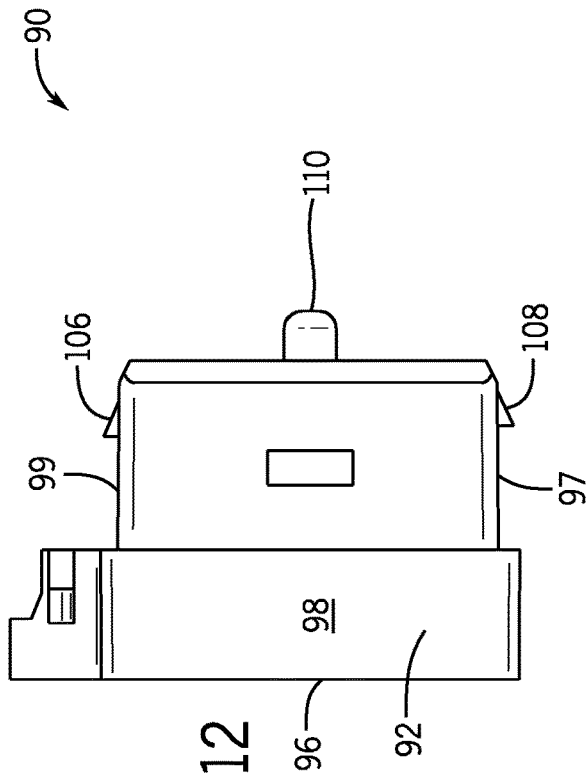
FIG. 12 is a side elevation view of the rear housing of FIG. 10.
Figure 13:
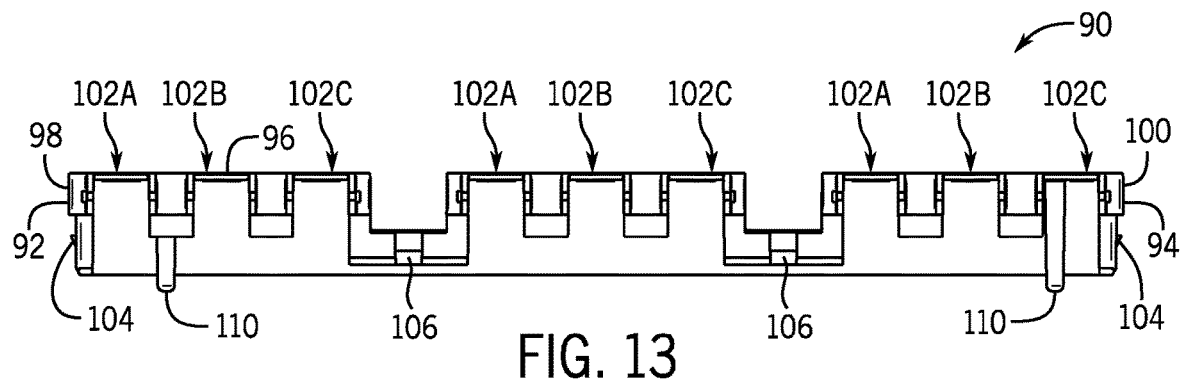
FIG. 13 is a top plan view of the rear housing of FIG. 10.
Figure 14:
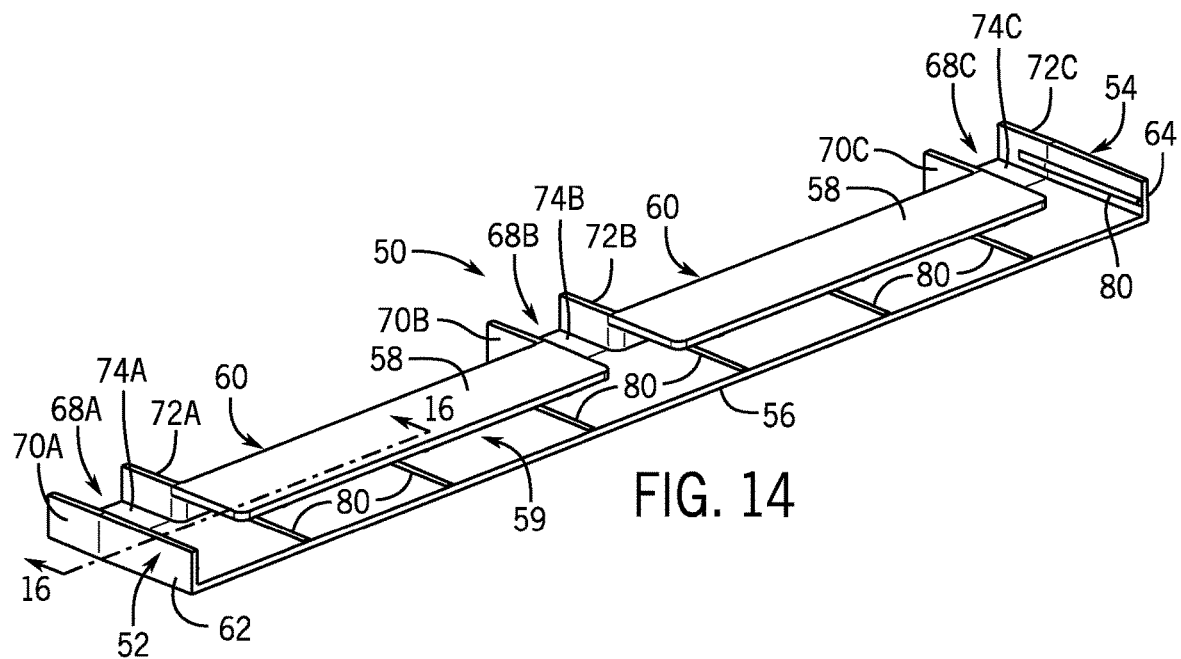
FIG. 14 is a perspective view of an insulating holder from the bus bar assembly of FIG. 1.
Figure 15:
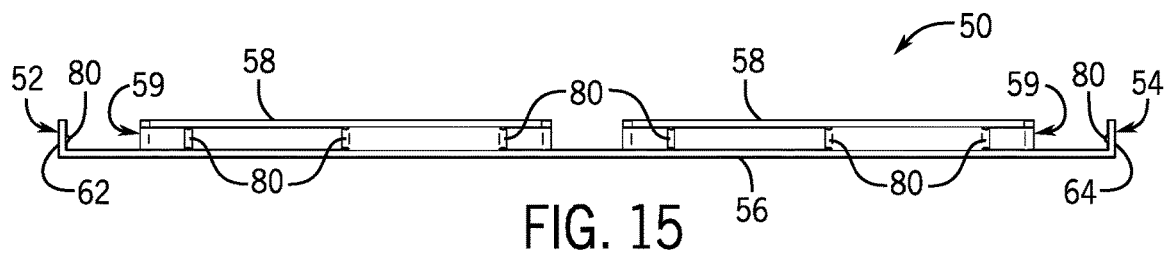
FIG. 15 is a front elevation view of the insulating holder of FIG. 14.
Figure 16:
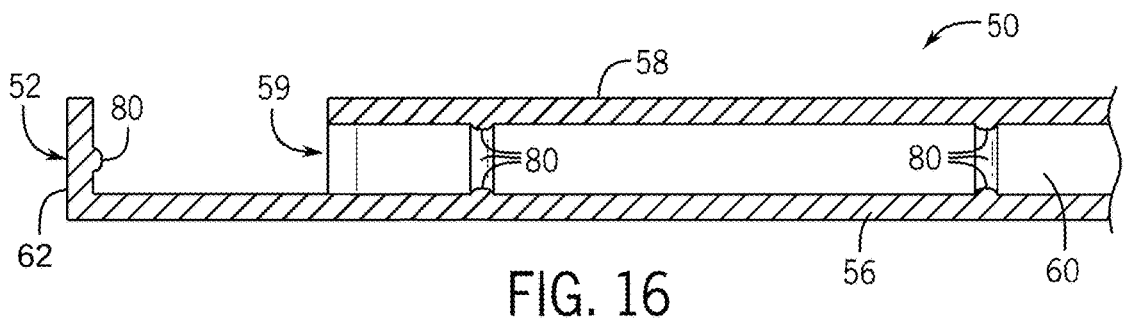
FIG. 16 is a partial sectional view of the insulating holder taken at 16-16 of FIG. 14.
Figure 17:
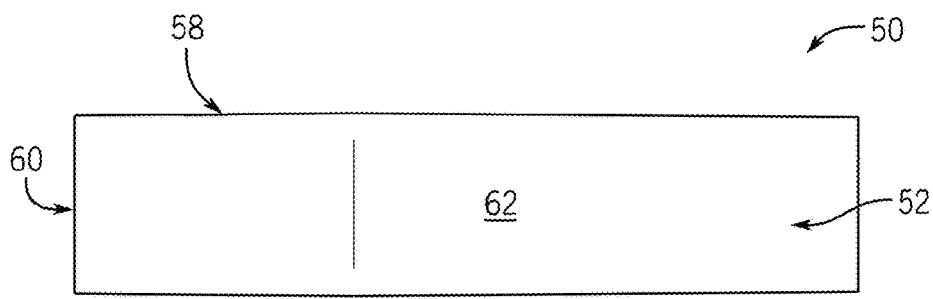
FIG. 17 is a side elevation view of the insulating holder of FIG. 14.
Figure 18:
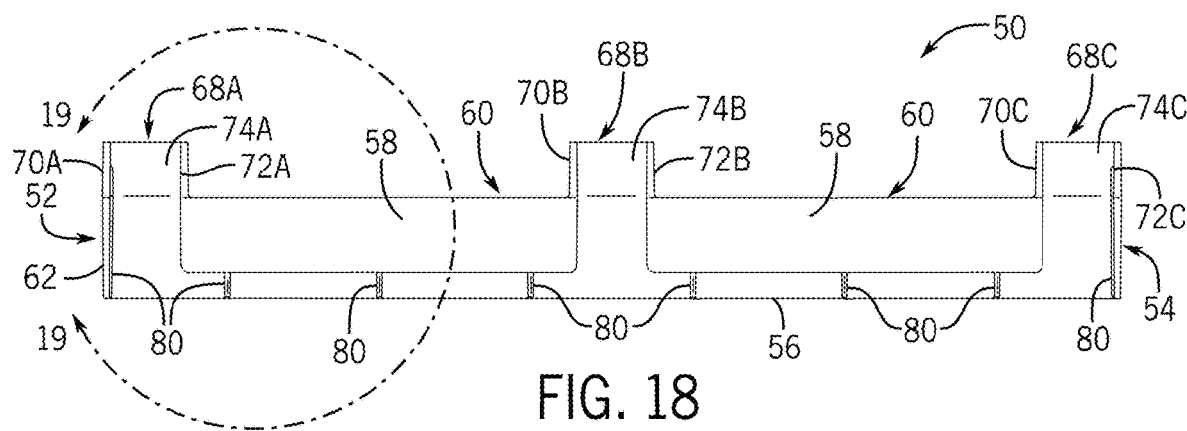
FIG. 18 is a top plan view of the insulating holder of FIG. 14.
Figure 19:
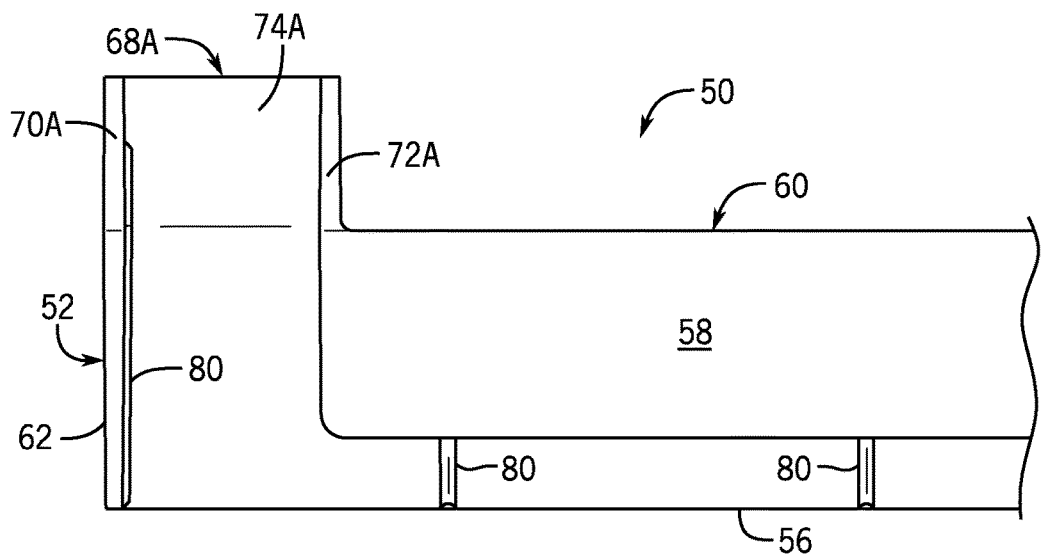
FIG. 19 is a closeup view of a portion of the insulating holder taken at 19-19 of FIG. 18.
Figure 20:
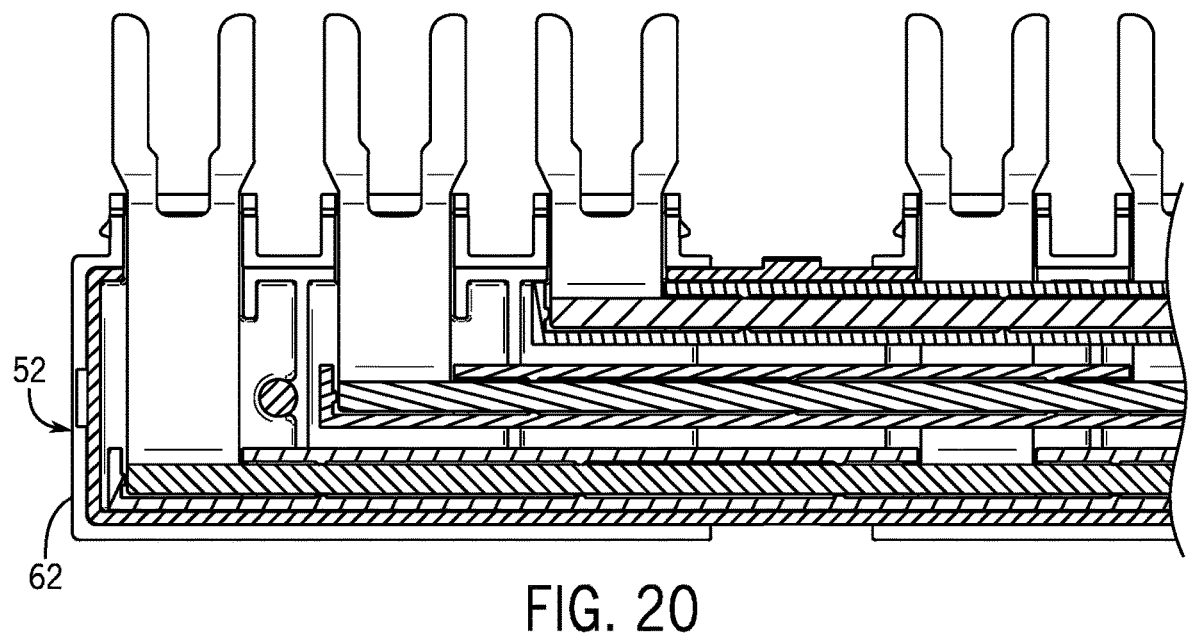
FIG. 20 is a partial section view of the bus bar assembly taken at 20-20 of FIG. 2.
Figure 21:
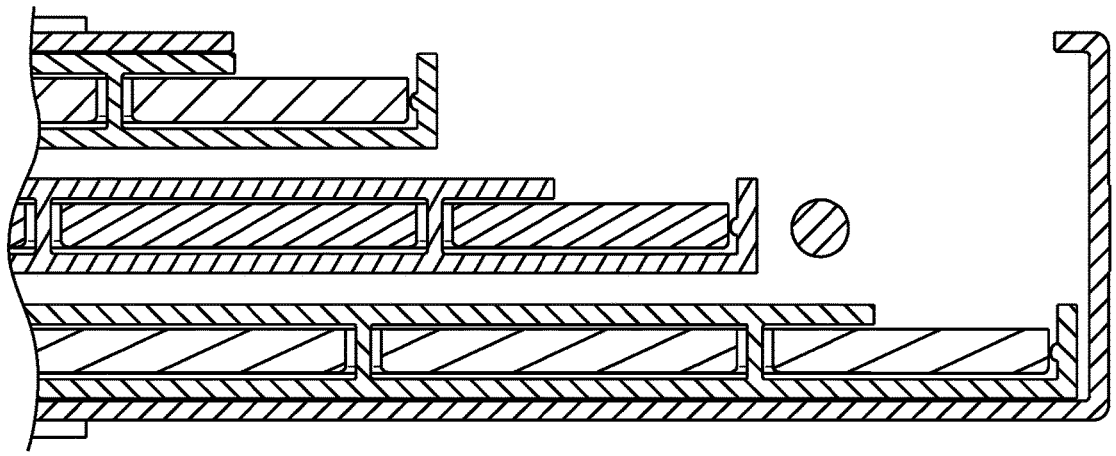
FIG. 21 is a partial section view of the bus bar assembly taken at 21-21 of FIG. 2.

According to the illustrated embodiment, the housing 15 is configured to receive three bus bars 18 and the corresponding insulating holders 50. A first bus bar 18A has terminal portions 35 (see also FIG. 6) which extend between the bottom and the top of the housing 15. The conducting member 25 (see also FIG. 6) for the first bus bar 18A then extends along the bottom of the interior of the housing 15 between each terminal portion 35 for the first bus bar 18A. A second bus bar 18B has terminal portions 35 which extend between the middle and the top of the housing 15. The conducting member 25 for the second bus bar 18B then extends along the middle of the interior of the housing 15 between each terminal portion 35 for the second bus bar 18B. A third bus bar 18C has terminal portions 35 which extend just within the top of the housing 15. The conducting member 25 for the third bus bar 18C then extends along the top of the interior of the housing 15 between each terminal portion 35 for the third bus bar 18A. Each bus bar 18A, 18B, 18C is inserted within the housing such that terminal portions 35 are positioned adjacent to but offset from each other. The different lengths of the terminal portions 35 for each bus bar 18A, 18B, 18C and inserting the bus bars adjacent to each other provide for a stacked and offset configuration of the bus bars 18 within the housing 15.

Turning next to FIGS. 6-9, a bus bar 18 for one phase of the bus bar assembly 10 is illustrated. The bus bar 18 is formed from a single piece of conductive material, such as copper. The bus bar 18 may initially be stamped out of a blank and then formed by subsequent stamping over a die, bending, or other techniques as would be understood in the art. The bus bar 18 includes a generally rectangular conducting member 25 extending from a first end 22 to a second end 24, opposite the first end. The generally rectangular conducting member 25 has an upper surface 26 and a lower surface 28, where the upper and lower surfaces 26, 28 are opposite each other and extend between the first and second ends 22, 24. The generally rectangular conducting member 25 also includes a front surface 30 and a rear surface 32. The front and rear surfaces 30, 32 extend between the upper and lower surfaces 26, 28. The front surface 30 also extends between the first end 22 and the second end 24. The rear surface 32 extends primarily between the first end 22 and the second end 24 except for regions from which a terminal portion 35A, 35B, or 35C extends.

Three terminal portions 35A, 35B, 35C extend from the rectangular conducting member 25. A first terminal portion 35A is located proximate the first end 22, a second terminal portion 35B is centrally positioned between the first end 22 and the second end 24, and a third terminal portion 35C is positioned proximate the second end 24. The first, second, and third terminal portions 35A, 35B, 35C are identical in construction. For case of description, the first terminal portion 35A will be discussed. It is understood the description of the first terminal portion 35A applies to the second terminal portion 35B and the third terminal portion 35C. Further, the number of terminal portions may vary, and a bus bar 18 may have just two terminal portions or more than three terminal portions. The terminal portion 35A has a first, lower portion 34A extending generally coplanar with and orthogonal from the rear surface 32 of the rectangular conducting member 25. The lower portion 34A extends for a first distance to a bend 38A and then extends along an upper portion 40A for a second distance from the bend 38A in a direction consistent with the upper surface 26 of the rectangular conducting member 25. According to the illustrated embodiment, the second distance of the upper portion 40A is greater than the first distance of the lower portion 34A. The second distance of the upper portion will vary between bus bars 18A, 18B, 18C, allowing the bus bars 18A, 18B, 18C to be positioned within the housing 15 in the stacked and offset configuration, discussed above. The upper portion 40A terminates at a distal end 36A in a pair of prongs 42A. It is noted that various reference numerals may be used without a letter following the reference numeral to refer to an element generally. The same reference numeral may be utilized with a letter following the reference numeral to distinguish between multiple elements illustrated in a single figure, where each element is otherwise identified by a common reference numeral. For example, an element, such as the distal end 36A described with respect to the first terminal portion 35A, which is identified as a distal end 36B or a distal end 36C corresponds to the distal end 36B of the second terminal portion 35B and the distal end 36C of the third terminal portion 35C, respectively. It is also noted that terms such as upper, lower, front, rear, left, tight, top, or bottom may be used herein. The terms are intended to be relational with respect to an illustrated embodiment being described and are not intended to be limiting. It is understood that the bus bar assembly 10 may be installed in a vertical orientation, a horizontal orientation, or rotated plus or minus any number of degrees up to one hundred eighty degrees about any axis of the assembly. The relational terms may subsequently change with respect to a particular orientation.

Turning next to FIGS. 14-19, one embodiment of an insulating holder 50 for each bus bar 18 is illustrated. The insulating holder 50 is molded of a single piece of plastic and extends between a first end 52 and a second end 54. The insulating holder 50 includes multiple surfaces defining a geometric shape and having an interior cavity and at least one open side configured to receive a bus bar 18. The illustrated insulating holder 50 includes a rear surface 56 which extends between the first end 52 and the second end 54 and is configured to cover the rear surface 32 of one of the bus bars 18. The insulating holder 50 also includes a pair of front surface segments 58, where each front surface segment 58 is positioned opposite the rear surface 56 and is configured to cover a portion of the front surface 30 of one of the bus bars. A pair of top surface segments 60 span between the rear surface 56 of the insulating holder 50 and the front surface segments 58, defining a cavity 59 between the rear surface 56, top surface segment 60, and front surface segment 58. The side opposite the top surface segments 60 is open and is configured to receive the bus bar 18. Each of the top surface segments 60 and the corresponding front surface segment 58 are positioned between two of the terminal portions of the bus bar 18 when a bus bar 18 is fit into the insulating holder 50. A first top surface segment 60 and front surface segment 58 are positioned between the first terminal portion 35A and the second terminal portion 35B of the bus bar 18, and a second top surface segment 60 and front surface segment 58 are positioned between the second terminal portion 35B and the third terminal portion 35C. The insulating holder 50 also includes a first side surface 62 and a second side surface 64. The first side surface 62 extends upward from the rear surface 56 along the first end 52 of the insulating holder 50, and the second side surface 64 extends upward from the rear surface 56 along the second end 54 of the insulating holder 50.

The insulating holder further includes u-shaped insulative members 68A, 68B, 68C, also referred to herein as a neck portion, configured to extend around the lower portion 34A, 34B, 34C of each terminal portion 35A, 35B, 35C. The first, second, and third u-shaped insulative members 68A, 68B, 68C are identical in construction. For ease of description, the first u-shaped insulative member 68A will be discussed. It is understood the description of the first u-shaped insulative member 68A applies to the second u-shaped insulative member 68B and the third u-shaped insulative member 68C. Further, the number of u-shaped insulative members may vary and is consistent with a number of terminal portions present on the bus bar 18. The first u-shaped insulative member 68A, or first neck portion, includes a first side surface 70A, a second side surface 72A, and a rear surface 74A. The second side surface 72A is opposite the first side surface 70A, and the rear surface 74A extends between the first and second side surfaces. The rear surface 74A is generally coplanar to and extends orthogonally from the rear surface 56 of the insulating holder 50. The rear surface 74A of the u-shaped insulative member 68A extends for a distance sufficient to cover the upper portion 40A of a terminal portion 35A of the bus bar 18 up to the pair of prongs 42 when a bus bar 18 is inserted into the insulating holder 50. Each side surface 72A, 74A extends upward to a height generally even with the height of the top surface segment 60 such that the side surfaces 72A, 74V extend upward past the sides of the upper portion 40A of a terminal portion 35A of the bus bar 18 when a bus bar 18 is inserted into the insulating holder 50. Each neck portion 68 extends around the lower portion 34 of a terminal portion 35 for the bus bar 18 between the conductive strip 25 and the bend 38 in the terminal portion.

Each insulating holder 50 further includes a series of ribs 80 positioned within the cavity 59 and along the u-shaped insulative member 68 to maintain a desired air gap between the insulating holder 50 and the bus bar 18 when the bus bar 18 is inserted into insulating holder 50. A series of ribs 80 are spaced apart along the rear surface 56 and facing into the cavity 59. A series of ribs 80 are similarly spaced apart along each top surface segment 60 and front surface segment 58 and facing into the cavity 59. According to the illustrated embodiment, the ribs 80 along the rear surface 56, top surface segment 60, and front surface segment 58 are aligned forming u-shaped ribs within the cavity 59. The u-shaped ribs 80 maintain a uniform spacing between the bus bar 18 and the rear, top and front surfaces of the insulating holder 50. A rib 80 extends along the first side surface 62 of the insulating holder 50 and on to the first side surface 70A of the first u-shaped insulative member 68A. Another rib 80 extends along the second side surface 64 of the insulating holder 50 and on to the second side surface 72C of the third u-shaped insulative member 68C. The two ribs 80 on each side of the insulting holder 50 maintain a desired lateral position for the bus bar 18 within the insulating holder 50.

Turning next to FIGS. 10-13, one embodiment of a rear housing 90 for the bus bar assembly 10 is illustrated. The rear housing 90 is molded of a single piece of plastic and extends between a first end 92 and a second end 94. The rear housing 90 has a rear surface 96, a first side surface 98, and a second side surface 100 opposite the first side surface. A lower surface 97 extends between the first side surface 98 and the second side surface 100 and shares an edge with the rear surface 96. An upper surface 99 is formed of multiple segments extending from an upper edge of the rear surface 96. The upper surface 99 is noncontinuous between the first and second side surfaces, defining channels between segments of the upper surface 99 through which the bus bars 18 extend. Each of the first side surface 98, second side surface 100, lower surface 97, and the segments of the upper surface 99 are formed of two generally planar sections with one planar section offset from the other. A first planar section, proximate the rear surface 96 shares an edge with the rear surface 96 and defines a first outer periphery of the rear housing. A second planar section, distal from the rear surface 96 is inset from the first planar section for a thickness equal to a thickness of the front housing 120. A second outer periphery of the rear housing is defined by the second planar sections, where the second outer periphery has a perimeter less than the first outer periphery. The portion of each surface defined by the second planar sections is configured to receive the front housing 120 over the second planar sections as the front housing slides together with the rear housing 90. The point at which the first and second planar sections are offset from each other serve as a positive stop to the front housing 120 as the front housing 120 is slid together with the rear housing 90, and the perimeter of the first planar sections is the same as the perimeter of the front housing 120 such that the outer surfaces of the housing are generally continuous when the rear housing 90 is connected to the front housing 120.

The illustrated rear housing 90 is configured to hold three bus bars 18 and three insulating holders 50. A first set of channels 102A is configured to allow each upper portion 40 of a first bus bar 18A to extend from an upper surface of the rear housing. A second set of channels 102B is configured to allow each upper portion 40 of a second bus bar 18B to extend from an upper surface of the rear housing. A third set of channels 102C is configured to allow each upper portion 40 of a third bus bar 18C to extend from an upper surface of the rear housing.

The rear housing 90 is configured to removably engage a front housing 120 for the bus bar assembly 10. The rear housing 90 includes at least one side tab 104, at least one upper tab 106, and at least one lower tab 108. According to the illustrated embodiment, the rear housing 90 includes a side tab 104 on the first side surface 98 and another side tab 104 on the second side surface 100. The rear housing 90 further includes a pair of upper tabs 106 on the segments of the upper surface 99 of the rear housing and a pair of lower tabs 108 on the lower surface 97 of the rear housing. Each tab 104, 106, 108 is tapered with a narrow end oriented away from and a thicker end oriented toward the rear surface 96 of the housing.

Figure 22:
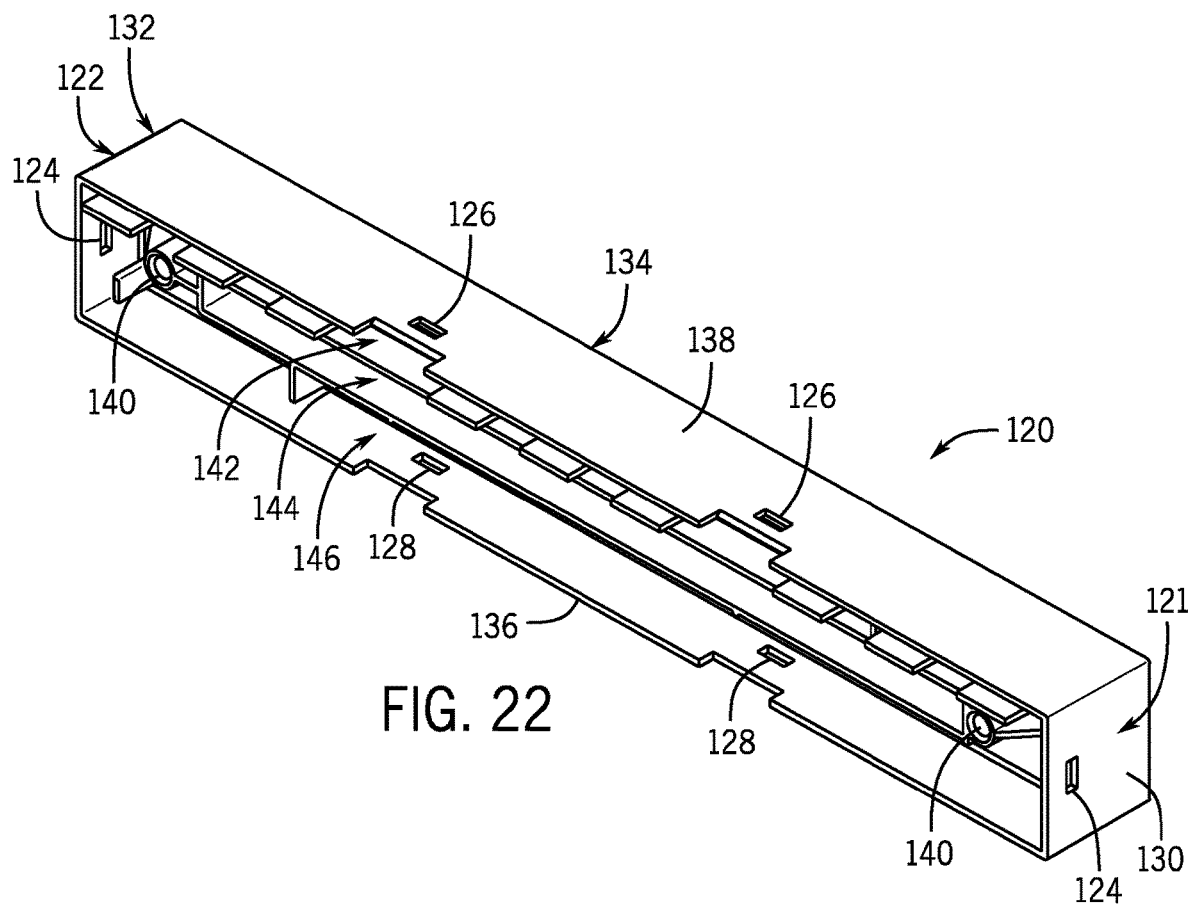
FIG. 22 is a perspective view of the front housing of the bus bar assembly of FIG. 1.
Figure 23:
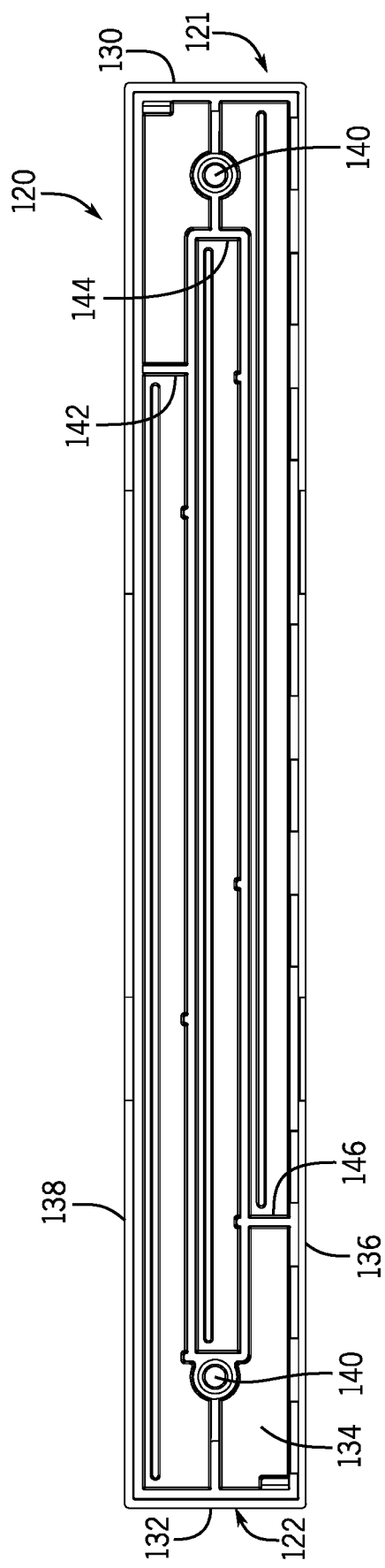
FIG. 23 is a rear elevation view of the front housing of FIG. 22.

With reference also to FIGS. 22-23, one embodiment of a front housing 120 for the bus bar assembly is illustrated. The front housing 120 extends between a first end 121 and a second end 122. The front housing 120 includes a first side surface 130 present on the first end 121 and a second side surface 132 present on the second end 122. A front surface 134 extends between the first side surface 130 and the second side surface 132. A lower surface 136 extends between the first side surface 130 and the second side surface 132 along the lower edge of the front surface 134, and an upper surface 138 extends between the first side surface 130 and the second side surface 132 along the upper edge of the front surface 134. The first and second side surfaces, front surface, lower and upper surfaces define a generally rectangular box with one open side configured to engage the rear housing 90.

The interior of the front housing 120 includes multiple slots, where each slot is configured to receive one of the insulating holders 50. According to the illustrated embodiment, a first slot 142 is positioned along the upper portion of the interior of the front housing 120. The first slot 142 extends from the second end 122 for a distance within the interior of the front housing 120, where the distance is less than the entire width of the interior. The second slot 144 is centrally positioned between the upper surface 138 and the lower surface 136 of the front housing 120. The second slot 144 is also centrally positioned between the first end 121 and the second end 122 and extends for a distance within the interior of the front housing 120, where the distance is less than the entire width of the interior. The third slot 146 extends from the first end 121 for a distance within the interior of the front housing 120, where the distance is less than the entire width of the interior. The distance of each slot 142, 144, 146 is substantially the same and positions three bus bars 18 within the front housing 120 at different heights and offset from each other.

As discussed above, the front housing 120 is configured to slidably engage the rear housing 90. The first side surface 130 of the front housing 120 includes a side opening 124 configured to receive a side tab 104 of the rear housing 90. The second side surface 132 of the front housing 120 also includes a side opening 124 configured to receive another side tab 104 of the rear housing 90. The upper surface 138 of the front housing 120 includes at least one upper opening 126, each upper opening configured to receive one upper tab 106 of the rear housing 90. The lower surface 136 of the front housing 120 includes at least one lower opening 128, each lower opening configured to receive one lower tab 108 of the rear housing 90. The front housing 120 is made from a resilient plastic such that each side surface 130, 132, the lower surface 136, and the upper surface 138 each deflect outward as the rear housing 90 engages the front housing 120. The tabs 104, 106, 108 on the rear housing 90 push the sides outward until the tabs reach their respective openings 124, 126, 128. When the tabs 104, 106, 108 are within the openings 124, 126, 128, the surfaces 130, 132, 136, 138 of the front housing 120 return to their original position and the tabs fit within the openings to retain the front housing together with the rear housing.

To facilitate alignment between the rear housing 90 and the front housing 120, the rear housing 90 includes a pair of alignment tabs 110. According to the illustrated embodiment, each alignment tab 110 is cylindrical and extends from the rear surface 96 of the rear housing 90. The base of each alignment tab 110 has a wider diameter and the alignment tab tapers toward the end of the alignment tab 110 protruding from the rear housing 90 to a narrower diameter. The narrower diameter of each alignment tab 110 at the end facilitates insertion of the alignment tab 110 within a complementary alignment cylinder 140 located on the front housing 120. As the front housing 120 engages the rear housing 90, the alignment tab 110 on the rear housing 90 slides into the alignment cylinder 140 on the front housing 120. The narrow diameter at the tip of the alignment tab 110 allows for some variation in alignment initially and still allows the alignment tab to fit into the alignment cylinder. As the two halves are slid together, the widening diameter pulls the two halves into alignment with the diameter of the base of each alignment tab 110 corresponding to an inner diameter of the alignment cylinder 140.

In operation, the bus bar assembly 10, as described above, provides an improved assembly to reduce partial discharge within the bus bar assembly 10. Each bus bar 18 is first inserted into one of the insulating holders 50. The ribs 80 within the interior cavity 59 of the insulating holder 50 position the bus bar 18 within the insulating holder 50. The inner surface of the cavity 59 for each insulating holder 50 is uniformly spaced from a surface of the bus bar 18. According to one aspect of the invention, an air gap is formed between the inner surface of the cavity 59 for each insulating holder 50 and the surface of the bus bar 18 having a width between two-tenths of a millimeter and one-half of a millimeter (0.2-0.5 mm). In one embodiment of the invention, the air gap is three-tenths of a millimeter (0.3 mm). The uniform spacing causes the electric field present within the bus bar assembly 10 to be distributed in a generally uniform manner across the length of the bus bar 18. Further, the width of the air gap, defined by the thickness of each rib 80, is selected such that the magnitude of the electromagnetic field is less than a level that will cause breakdown of the insulating holder 50.

After inserting each bus bar 18 into an insulating holder 50, the combined bus bar and insulating holder 50 are each inserted into one of the slots 142, 144, 146 of the front housing 120. The slots 142, 144, 146 position the bus bars 18 and their corresponding insulating holder 50 within the housing. Each of the terminal portions 35A, 35B, 35C of the bus bars 18A, 18B, 18C extend from the top of the bus bar assembly 10 in a generally planar arrangement for the same distance, such that the bus bar assembly 10 may be fit into terminal blocks on a device within a power distribution center. The rear housing 90 is then fit onto the front housing 120 forming the bus bar assembly 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. An insulating holder for a bus bar, comprising:
   a first surface configured to cover a corresponding first surface of the bus bar, wherein the bus bar has a first terminal, a second terminal, and a conductive strip between the first terminal and the second terminal;
   a second surface configured to cover a portion of a corresponding second surface of the bus bar, wherein the second surface is opposite the first surface;
   a spanning surface extending between the first surface and the second surface;
   a first side surface extending orthogonally from the first surface toward the second surface;
   a second side surface extending orthogonally from the first surface toward the second surface, wherein:
      the second side surface is opposite the first side surface,
      a cavity is defined between the first surface, the second surface, the spanning surface, the first side surface, and the second side surface, and
      the cavity is configured to receive, at least in part, the bus bar; and
   a plurality of ribs, wherein each of the plurality of ribs is positioned on either the first surface, the second surface, the spanning surface, the first side surface, or the second side surface facing toward the cavity and wherein the plurality of ribs includes:
      a first rib on the first side surface;
      a second rib on the second side surface;
      a plurality of third ribs on the first surface;
      a plurality of fourth ribs on the second surface, and
      a plurality of fifth ribs on the spanning surface.

2. The insulating holder of claim 1, wherein the first terminal and the second terminal of the bus bar extend orthogonal from the conductive strip, the insulating holder further comprising:
   a first neck portion including:
      a surface coplanar with and extending orthogonal from the first surface of the insulating holder,
      a first side portion extending from the surface along a first side of the first terminal, and
      a second side portion extending from the surface along a second side of the first terminal; and
   a second neck portion including:
      a surface coplanar with and extending orthogonal from the first surface of the insulating holder,
      a first side portion extending from the surface along a first side of the second terminal, and
      a second side portion extending from the surface along a second side of the second terminal.

3. The insulating holder of claim 2, wherein:
   a first rib, selected from the plurality of ribs, is located on the first side portion of the first neck portion;
   the first rib has a first thickness,
   the first terminal has a first width,
   the second side portion of the first neck portion is spaced apart from the first side portion of the first neck portion by the first width plus two times the first thickness;
   a second rib, selected from the plurality of ribs, is located on the second side portion of the second neck portion;
   the second rib has a second thickness;
   the second terminal has a second width;

the first side portion of the second neck portion is spaced apart from the second side portion of the second neck portion by the second width plus two times the second thickness.

4. The insulating holder of claim 3, wherein:
the bus bar has a third terminal and the conductive strip extends between the second terminal and the third terminal;
the first surface is further configured to cover a first surface of the third terminal and the conductive strip extending between the second and third terminals;
the second surface includes a first segment configured to cover a first portion of the second surface of the bus bar between the first terminal and the second terminal and a second segment configured to cover a second portion of the second surface of the bus bar between the second terminal and the third terminal; and
the spanning surface is configured to extend between the first surface and each of the first and second segments of the second surface.

5. The insulating holder of claim 4, wherein:
the second neck portion extends around the third terminal; and
the insulating holder further comprises a third neck portion extending around the second terminal, the third neck portion including:
a surface coplanar with and extending orthogonal from the first surface of the insulating holder,
a first side portion extending from the surface along the first side of the second terminal, and
a second side portion extending from the surface along the second side of the second terminal.

6. The insulating holder of claim 1, wherein the plurality of ribs establishing a uniform air gap between a surface of the cavity and the bus bar.

7. A bus bar assembly, comprising:
a plurality of bus bars, wherein each of the plurality of bus bars includes:
a first terminal,
a second terminal, and
a conductive strip extending between the first terminal and the second terminal;
a plurality of insulating holders, wherein:
each of the plurality of insulating holders further comprises:
a first neck portion, including:
a first side portion extending along a first side of the first terminal, and
a second side portion extending along a second side of the first terminal; and
a second neck portion including:
a first side portion extending along a first side of the second terminal, and
a second side portion extending along a second side of the second terminal;
each of the plurality of insulating holders is configured to be mounted to one of the plurality of bus bars,
each of the plurality of insulating holders includes a plurality of ribs positioned within an interior cavity of a corresponding insulating holder,
the plurality of ribs maintain a desired air gap between each insulating holder and a corresponding bus bar mounted in the insulating holder,
one of the plurality of ribs extends along the first side portion of the first neck portion, and
another one of the plurality of ribs extends along the second side portion of the second neck portion; and
a housing configured to receive each of the plurality of bus bars and the corresponding insulating holder.

8. The bus bar assembly of claim 7, wherein the housing includes a plurality of slots and each of the plurality of slots is configured to receive one of the plurality of insulating holders mounted to a corresponding bus bar.

9. The bus bar assembly of claim 8, wherein the plurality of bus bars includes a first bus bar, a second bus bar, and a third bus bar and wherein the plurality of insulating holders include a first insulating holder mounted to the first bus bar, a second insulating holder mounted to the second bus bar, and a third insulating holder mounted to the third bus bar.

10. The bus bar assembly of claim 9, wherein the housing includes:
a first slot configured to receive the first insulating holder mounted to the first bus bar;
a second slot configured to receive the second insulating holder mounted to the second bus bar; and
a third slot configured to receive the third insulating holder mounted to the third bus bar.

11. The bus bar assembly of claim 7, wherein:
each of the plurality of insulating holders further comprises a plurality of surfaces configured to enclose, at least in part, the conductive strip, wherein:
the plurality of surfaces define the interior cavity of each of the plurality of insulating holders, and
each of the plurality of surfaces includes at least one of the plurality of ribs to position the corresponding bus bar within the insulating holder.

12. The bus bar assembly of claim 7, wherein the first terminal and the second terminal of each of the plurality of bus bars extend orthogonal from the conductive strip.

13. The bus bar assembly of claim 7, wherein:
each of the plurality of bus bars further comprises a third terminal and the conductive strip extends between the second terminal and the third terminal; and
each of the plurality of insulating holders further comprises:
a third neck portion, including:
a first side portion extending along a first side of the third terminal, and
a second side portion extending along a second side of the third terminal.

14. The bus bar assembly of claim 13, wherein:
one of the plurality of ribs extends along the first side portion of the first neck portion, and
another one of the plurality of ribs extends along the second side portion of the third neck portion.

15. The bus bar assembly of claim 7, wherein the plurality of ribs establish a uniform air gap between a surface of the interior cavity for the corresponding insulating holder and the corresponding bus bar.

16. An insulating holder for a bus bar, comprising:
a plurality of sides defining a geometric shape having an interior cavity and at least one open side surface, wherein the at least one open side surface is configured to receive the bus bar within the interior cavity of the insulating holder;
a first neck portion for extending around a first terminal of the bus bar, including:
a first side portion extending along a first side of the first terminal, and
a second side portion extending along a second side of the first terminal; and
a second neck portion for extending around a second terminal of the bus bar, including:

a first side portion extending along a first side of the second terminal, and a second side portion extending along a second side of the second terminal; and a plurality of ribs, wherein:

each of the plurality of ribs is spaced apart within the interior cavity, the plurality of ribs establishes a uniform air gap between a surface of the interior cavity and the bus bar, one of the plurality of ribs extends along the first side portion of the first neck portion, and another one of the plurality of ribs extends along the second side portion of the second neck portion.

17. The insulating holder of claim 16, wherein the air gap is between 0.2 mm and 0.5 mm in width.

18. The insulating holder of claim 16 further comprising a housing including at least one slot configured to position the insulating holder within the housing.

* * * * *